(12) United States Patent
Vosseller et al.

(10) Patent No.: US 12,154,151 B2
(45) Date of Patent: Nov. 26, 2024

(54) TRANSACTION ACCESS CONTROL USING TOKENIZED REPUTATION SCORES

(71) Applicant: eBay Inc., San Jose, CA (US)

(72) Inventors: Shannon Bruce Vosseller, San Francisco, CA (US); Andrew Chalkley, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/223,232

(22) Filed: Jul. 18, 2023

(65) Prior Publication Data

US 2023/0360097 A1   Nov. 9, 2023

Related U.S. Application Data (63) Continuation of application No. 17/492,894, filed on Oct. 4, 2021, now Pat. No. 11,748,793.

(51) Int. Cl.
| | |
|---|---|
| *G06Q 30/06* | (2023.01) |
| *G06Q 20/38* | (2012.01) |
| *G06Q 20/40* | (2012.01) |
| *G06Q 30/0601* | (2023.01) |
| *G06Q 30/08* | (2012.01) |
| *H04L 9/00* | (2022.01) |
| *H04L 9/32* | (2006.01) |

(52) U.S. Cl.
CPC ... *G06Q 30/0609* (2013.01); *G06Q 20/38215* (2013.01); *G06Q 20/389* (2013.01); *G06Q 20/405* (2013.01); *G06Q 30/08* (2013.01); *H04L 9/3236* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 8,194,550 B2 | 6/2012 | Shorey et al. | |
| 8,719,154 B2 | 5/2014 | Shastry et al. | |
| 10,268,829 B2 | 4/2019 | Roets et al. | |
| 10,546,296 B2 | 1/2020 | Narasimhan et al. | |
| 11,133,936 B1 | 9/2021 | Branton | |
| 11,165,787 B2 | 11/2021 | Sloane et al. | |
| 11,392,947 B1 | 7/2022 | Prasad et al. | |

(Continued)

FOREIGN PATENT DOCUMENTS

WO    2015191741 A1    12/2015

OTHER PUBLICATIONS

U.S. Appl. No. 17/492,924, "Non-Final Office Action", U.S. Appl. No. 17/492,924, filed Dec. 20, 2023, 22 pages.

(Continued)

*Primary Examiner* — Nicholas D Rosen
(74) *Attorney, Agent, or Firm* — FIG. 1 Patents (57) ABSTRACT

Techniques are described, as implemented by computing devices, to control access to transactions through use of tokenized reputation scores. This is performed by leveraging a blockchain such that a tokenized reputation score is generated or calculated based on an amount of reputation tokens associated with a blockchain account address associated with a service provider account, and by making transactional functionality available to the service provider account based on a comparison of a tokenized reputation score affiliated with the service provider account with a threshold score associated with a transaction.

20 Claims, 6 Drawing Sheets

(56) References Cited

U.S. PATENT DOCUMENTS

| | | | |
|---|---|---|---|
| 11,449,819 | B2 | 9/2022 | Heath et al. |
| 11,652,604 | B2 | 5/2023 | Gundavelli et al. |
| 11,748,746 | B2* | 9/2023 | Pillai ............... G06Q 20/325 |
| | | | 705/71 |
| 11,748,793 | B2 | 9/2023 | Vosseller et al. |
| 11,861,400 | B2 | 1/2024 | Wentz |
| 11,922,453 | B2* | 3/2024 | Vlahovic ........... G06Q 20/4016 |
| 11,983,610 | B2* | 5/2024 | Poletti ................ G06N 20/00 |
| 12,100,001 | B2 | 9/2024 | Vosseller et al. |
| 2006/0184440 | A1 | 8/2006 | Britti et al. |
| 2009/0006115 | A1 | 1/2009 | Schwarz |
| 2010/0201543 | A1 | 8/2010 | Shorey et al. |
| 2011/0106643 | A1 | 5/2011 | Berkowitz |
| 2017/0011395 | A1* | 1/2017 | Pillai ................... G06Q 20/40 |
| 2017/0300912 | A1 | 10/2017 | Narasimhan et al. |
| 2017/0364920 | A1 | 12/2017 | Anand |
| 2019/0095631 | A1 | 3/2019 | Roets et al. |
| 2019/0303807 | A1 | 10/2019 | Gueye |
| 2019/0312734 | A1 | 10/2019 | Wentz et al. |
| 2020/0027089 | A1 | 1/2020 | Kuchar et al. |
| 2020/0034457 | A1 | 1/2020 | Brody et al. |
| 2020/0052917 | A1 | 2/2020 | Corral et al. |
| 2020/0067696 | A1 | 2/2020 | Sarin |
| 2020/0162261 | A1 | 5/2020 | Iyer |
| 2020/0313897 | A1 | 10/2020 | Heath et al. |
| 2020/0410460 | A1 | 12/2020 | Nissan et al. |
| 2021/0064780 | A1 | 3/2021 | Riedel et al. |
| 2021/0067518 | A1 | 3/2021 | Sloane et al. |
| 2021/0160082 | A1 | 5/2021 | Wang |
| 2021/0174247 | A1 | 6/2021 | Poletti et al. |
| 2021/0176340 | A1 | 6/2021 | Rose et al. |
| 2021/0390531 | A1 | 12/2021 | Voorhees et al. |
| 2022/0150050 | A1 | 5/2022 | Gundavelli et al. |
| 2023/0103398 | A1 | 4/2023 | Vosseller et al. |
| 2023/0108817 | A1 | 4/2023 | Vosseller et al. |
| 2023/0108983 | A1 | 4/2023 | Vosseller et al. |
| 2023/0113795 | A1 | 4/2023 | Vlahovic et al. |
| 2023/0135294 | A1 | 5/2023 | Vosseller et al. |
| 2024/0169388 | A1* | 5/2024 | Vlahovic ........... G06Q 30/0609 |

OTHER PUBLICATIONS

U.S. Appl. No. 17/518,820, "Non-Final Office Action", U.S. Appl. No. 17/518,820, filed Jan. 19, 2024, 17 pages.

"A group of experts intends to sell the Colosseum . . . in digital format", Translated by ContentEngine LLC. CE Noticias Financieras, English ed. [Miami], Jul. 27, 2021, 2 pages.

"Blockchain Video Platform Viuly.io Connects to Ethereum Mainnet", Cision, PR Newswire [retrieved Mar. 28, 2023]. Retrieved from the Internet <https://www.prnewswire.com/news-releases/blockchain-video-platform-viulyio-connects-to-ethereum-mainnet-300589200.html>, Jan. 27, 2018, 4 pages.

"The genesis, vision and what makes Decentralized Reputation System", M2 Presswire [Coventry] Retrieved from the Internet <http://www.m2.com>, Jun. 1, 2018, 3 pages.

U.S. Appl. No. 17/492,894, "Corrected Notice of Allowability", U.S. Appl. No. 17/492,894, filed Jun. 22, 2023, 11 pages.

U.S. Appl. No. 17/492,894, "Non-Final Office Action", U.S. Appl. No. 17/492,894, filed Mar. 28, 2023, 26 pages.

U.S. Appl. No. 17/492,894, "Notice of Allowance", U.S. Appl. No. 17/492,894, filed Jun. 7, 2023, 13 pages.

U.S. Appl. No. 17/492,924, "Final Office Action", U.S. Appl. No. 17/492,924, filed Aug. 15, 2023, 24 pages.

U.S. Appl. No. 17/492,924, "Non-Final Office Action", U.S. Appl. No. 17/492,924, filed Mar. 14, 2023, 24 pages.

Abdo, et al., "Permissionless reputation-based consensus algorithm for blockchain", Internet Technology Letters, 3 (3), e151, Retrieved from Internet URL: https://doi.org/10.1002/it/2.151, Apr. 10, 2020, 6 Pages.

Ahn, Jaehong, et al., "A Model for Deriving Trust and Reputation on Blockchain-Based e-Payment System", Applied Sciences, vol. 9, No. 24 [retrieved Mar. 28, 2023]. Retrieved from the Internet <https://doi.org/10.3390/app9245362>, Dec. 8, 2019, 18 pages.

Eckhardt, Giana M, "Playing the Trust Game Successfully in the Reputation Economy", Volume & Issue: vol. 12, No. 2 [retrieved Mar. 28, 2023]. Retrieved from the Internet <https://doi.org/10.2478/nimmir-2020-0011>, Oct. 22, 2020, 8 pages.

Khairuddin, Irni Eliana, "Understanding and Designing for Trust in Bitcoin Blockchain", Lancaster University, School of Computing and Communications [retrieved Mar. 28, 2023]. Retrieved from the Internet <https://core.ac.uk/download/pdf/227519686.pdf>, Apr. 2019, 350 pages.

Levin, Richard B, et al., "Bitcoin Investment Vehicles Beware— The SEC is Watching", BakerHostetler Blog, Baker & Hostetler LLP [retrieved Jun. 7, 2023]. Retrieved from the Internet <https://www.bakerlaw.com/alerts/bitcoin-investment-vehicles-beware-the-sec-is-watching>, Jun. 24, 2014, 3 pages.

U.S. Appl. No. 17/492,924, "Final Office Action", U.S. Appl. No. 17/492,924, filed Apr. 11, 2024, 20 pages.

U.S. Appl. No. 17/518,820, "Notice of Allowance", U.S. Appl. No. 17/518,820, filed Jun. 6, 2024, 8 pages.

* cited by examiner

TRANSACTION ACCESS CONTROL USING TOKENIZED REPUTATION SCORES

RELATED APPLICATIONS

This application is a continuation of and claims priority to U.S. patent application Ser. No. 17/492,894, filed Oct. 4, 2021, entitled "Transaction Access Control Using Tokenized Reputation Scores," the entire disclosure of which is hereby incorporated by reference herein in its entirety.

BACKGROUND

In the last decade, the Internet has expanded dramatically. More and more people around the world connect to the Internet, becoming a part of the worldwide computer network. By connecting to the Internet, users have access to vast amounts of information, which they can use to fulfill their needs. For example, instead of going to a physical auction house, an Internet user can surf to an online auction website and place bids on an item listed.

Sometimes, the open access of online users to transactions on the Internet result in adverse outcomes. This is because uncontrolled access enables disreputable users to participate in transactions. By way of example, a frustrating aspect of transacting online is the common occurrence of winning bidder accounts that do not pay for an item listed for an online auction. Not only do nonpaying bidder accounts waste a listing account's time, labor, and opportunities, but nonpaying bidder accounts also result in ruining honest bidding accounts' chances of winning an online auction. Often, these nonpaying bidder accounts are new accounts without an indication of reputability, such as existing feedback or reviews. Other times, these new accounts are throwaway accounts of either new users that transact poorly due to inexperience, or disreputable users who do not have meaningful incentives to transact in good faith. The conventional techniques for controlling access to transactions often inefficiently require proactive, manual effort by vigilant listing accounts, such as to cancel bids of bidding accounts, blocking bidding accounts, etc. This includes research the profiles of bidding accounts to make inferences of a bidding account's disreputability or lack of reputability, such as to identify a negative feedback rating, a feedback profile with excessive negative comments, a young age of the bidding account, a lack of transaction history, and so forth. In this manner, conventional techniques used to control access to transactions online enable and facilitate such adverse outcomes.

Accordingly, conventional techniques for controlling access to transactions online do not account for the reputability of user accounts, and therefore result in adverse outcomes.

SUMMARY

Conventional techniques for controlling access to transactions online do not account for the reputability of service provider accounts, and therefore result in adverse outcomes such as damages, costs, risk, and lost opportunities. To overcome these problems, techniques are leveraged, as implemented by computing devices, to control access to transactions through the use of tokenized reputation scores. These techniques are performed by leveraging a blockchain such that cryptographic tokens establishing reputability—reputation tokens—are utilized to generate a tokenized reputation score for a service provider account. These techniques also include making transactional functionality available to the service provider account based on a tokenized reputation score affiliated with a service provider account. Throughout this discussion, "tokenized reputation score" and "reputation score" are used interchangeably.

In one example, a service provider system generates a reputation score affiliated with a service provider account associated with a blockchain account address based on an amount of reputation tokens associated with the blockchain account address. Further, the service provider system receives, from the service provider account, a request to perform a transaction. The service provider account obtains a threshold score associated with the transaction. The service provider system then determines whether the transaction is permitted or denied by comparing the reputation score affiliated with the service provider account with the threshold score associated with the transaction and uses this to control access. In this manner, access by a service provider account to transactional functionality is controlled based on a tokenized reputation score affiliated with the service provider account.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Techniques are described, as implemented by computing devices, to control access to transactions through use of tokenized reputation scores. This is performed by leveraging a blockchain such that a tokenized reputation score is generated or calculated based on an amount of reputation tokens associated with a blockchain account address associated with a service provider account, and by making transactional functionality available to the service provider account based on a tokenized reputation score affiliated with the service provider account.

In one or more implementations, a service provider system generates a reputation score affiliated with a service provider account associated with a blockchain account address. For instance, a service provider system generates a reputation score affiliated with a service provider account associated with a blockchain account address via a service platform of the service provider system. The reputation score may be expressed in a variety of ways, including but not limited to a normalized score, a ranking, a probability, a percentage, a fraction, semantically, numerically, as digital content, or so forth.

As discussed throughout, in one or more implementations, the service provider system generates a reputation score based on an amount of reputation tokens associated with the blockchain account address. In one or more implementations, the reputation tokens are cryptographic tokens (e.g., cryptographic utility tokens, cryptographic reward tokens, fungible cryptographic tokens, and/or non-fungible cryptographic tokens, to name a few examples).

In one or more implementations, the generating of the reputation score is based additionally or alternatively on transactional data of the blockchain account address associated with the service provider account. By way of example, a longer length of a transactional history of a blockchain account address associated with a service provider account may result in generating a higher reputation score than a shorter length of a transactional history of a blockchain account address associated with a service provider account.

Further, the service provider system receives, from the service provider account, a request to perform a transaction. A request to perform a transaction may be submitted by a service provider account in a variety of ways, such as in real time, via a prescheduled request, and so forth. A request to perform a transaction may be received from via a variety of computing devices, including XR devices, laptop devices, desktop computers, mobile devices, and so forth. The request to perform a transaction may be input via a variety of ways, such as via oral input, physical touch, recognized gestures, and so forth. The request to perform a transaction may be input via a variety of ways, including via user input via a user interface of a client device, via a companion device of a client device, and so forth. A variety of transactions are contemplated, including but not limited to auction transactions, NFT transactions, swapping transactions, sale transactions, purchase transactions, and so forth.

Further, the service provider system obtains a threshold score associated with the transaction. The threshold score may be expressed in different ways, such as a normalized score, a ranking, a probability, a percentage, a fraction, semantically, numerically, or so forth. The threshold score may be obtained through generation or calculation of the threshold score via the use of machine learning. Additionally, or alternatively, the threshold score is preset by the host service provider account hosting a transaction. In this way, the host service provider account presets a level of risk that they are comfortable with. In one or more example, a different threshold score may be obtained for different service provider accounts depending on a different amount of risk predicted for different service provider accounts. By way of example, a newly created service provider account may result in obtaining a higher threshold score, in contrast to a lower threshold score obtained for a more, long-term service provider account.

In one or more implementations, the threshold score is selected from a plurality of threshold scores, each threshold score of the plurality of threshold scores corresponding to a type of transaction. By way of example, a lower threshold score may be selected for a purchase transaction, in contrast to an auction transaction due to the generally straight forward nature of simply purchasing a listed item in contrast to the higher risk shoulder by host service accounts that host auction transactions.

Additionally, or alternatively, the threshold score is selected from a plurality of threshold scores, each threshold score of the plurality of threshold scores corresponding to an amount involved in a transaction. By way of example, a higher amount of value (e.g., a higher amount of cryptocurrency, fiat currency, or so forth) involved in a transaction can result in the selection of a higher threshold score than a transaction involving a lower amount of value.

Further, the service provider system determines whether the transaction is permitted or denied by comparing the reputation score affiliated with the service provider account with the threshold score associated with the transaction. In one or more implementations, determining that a transaction is denied includes determining that the reputation score is equal to or lower than the threshold score. Alternatively, or additionally, determining that a transaction is permitted includes determining that the reputation score is equal to or higher than the threshold score.

Based on a determination by the service provider system that the transaction is permitted, the transaction is permitted for the service provider account. Permitting of a transaction may be communicated to a client device of a service provider system via a notification (e.g., a push notification, an SMS message, a digital message, a voice message, a popup notification) or other indications of the permitting of the transaction, such as changes of the digital content displayed via the user interface of the client device of the service provider account.

Based on a determination by the service provider system that the transaction is denied, the transaction is denied for the service provider account. In one or more examples, a determination by the service provider system may be that the service transaction is denied in part. For such instances, the transactional functionality of the denied parts are denied to a service provider account. Similar to the permitting of a transaction, the denial or preventing of a transaction may be communicated to a client device of a service provider system via a notification (e.g., a push notification, an SMS message, a digital message, a voice message, a popup notification) or other indications of the denial of the transaction, such as changes of the digital content displayed via the user interface of the client device of the service provider account. In this manner, access by a service providers account to transactions or transactional functionality are controlled based on a tokenized reputation score of the service provider account.

The described techniques also confer additional benefits. For example, the described techniques prevent friction at the service provider system because leveraging of a blockchain system minimizes the need for costly intermediary parties and facilitates further automation and efficiency of the service provider system. The described techniques also provide improved protection for host service provider accounts because controlling the access of service provider accounts to transactions based on tokenized reputation scores lowers the conventional risk of hosting transactions online. Accordingly, the described techniques improve the probability of a host service provider account hosting transactions.

Further, the described techniques provide users with personal ownership over reputation tokens, and therefore a universal reputation. Unlike conventional indications of reputability, such as review or feedback data owned by a service provider system, reputation token data is not owned by the service provider system. This is because the described techniques are non-custodial, rather than custodial. In short, the service provider system does not own an amount of reputation tokens associated with a blockchain account address. Instead, a user with a private key associated with a blockchain account address associated with the amount of reputation tokens has ownership of the amount of reputation tokens. In this way, a user that owns an amount of reputation tokens is empowered to evidence their universal reputation outside of the service provider system. For instance, among a plurality of service provider systems, among a plurality of governments, or so forth.

Moreover, because reputation token data is recorded via a decentralized system instead of a centralized system and is secured via cryptography, an amount of reputation tokens associated with a blockchain account address is resistant to tampering or deletion by parties without a private key associated with the blockchain account address. In contrast, data owned by a centralized system (e.g., a centralized service provider system) is vulnerable to tampering, deletion, breaches, and other adverse outcomes.

Regardless, the described techniques enable owners of reputation tokens to unlock access to transactional functionality that otherwise would not be available to service provider accounts that have not yet established reputability directly with a service provider system.

Further discussion of these and other examples is included in the following sections and shown in corresponding figures. In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
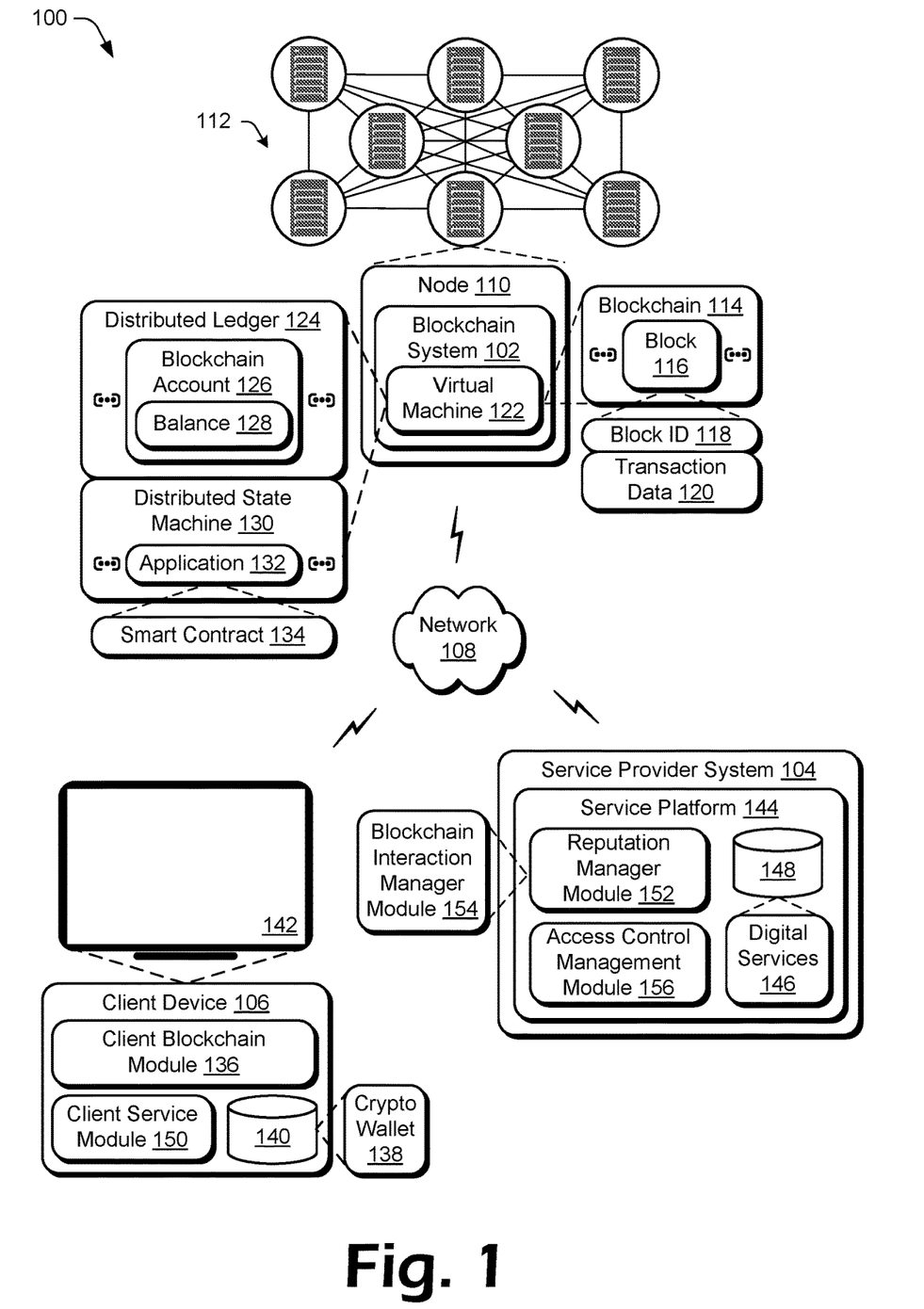
FIG. 1 is an illustration of an environment in an example blockchain implementation that is operable to employ transaction access control techniques using tokenized reputation scores as described herein.

FIG. 1 is an illustration of a blockchain environment 100 in an example implementation that is operable to employ techniques described herein. The blockchain environment 100 includes a blockchain system 102, a service provider system 104, and a client device 106 that are communicatively coupled, one to another, via a network 108.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), IoT device, a wearable device, AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 6.

The blockchain system 102 is implemented by a plurality of nodes 110. Nodes 110 are a runtime implemented using processing, memory, and network resources of respective computing devices 112 that operate as the infrastructure of the blockchain 114. As part of this, the nodes 110 store, communicate, process, and manage data that makes up the blockchain 114. Nodes 110 are interconnected as illustrated in FIG. 1 to exchange data via the network 108, e.g., as a peer-to-peer network in a distributed and decentralized manner.

The blockchain 114 is formed using a plurality of blocks 116, illustrated in FIG. 1 as including respective block identifiers (IDs) 118 and transaction data 120. Transaction data 120 of the blocks 116 includes batches of validated transactions that are hashed and encoded. Each block 116 includes a cryptographic hash of a prior block 116 in the blockchain 114, thereby linking the blocks 116 to each other to form the blockchain 114. As a result, the blocks 116 cannot be altered retroactively without altering each subsequent block 116 in the blockchain 114 and in this way protects against attacks by malicious parties.

In order to generate the blocks 116 for addition to the blockchain 114, a node 110 is implemented as a "miner" to add a block of transactions to the blockchain 114. The other nodes 110 of the blockchain system 102 then check if the block of transactions is valid, and based on this, determine whether to accept or reject this data. If valid, the block of transactions is stored as transaction data 120 along with a block ID 118 for a respective block 116, e.g., is stored "at the end" or "at the top" of the blockchain 114 along with a hash of a previous block in the chain. The nodes 110 then broadcast this transaction history via the network 108 for sharing with other nodes 110. This acts to synchronize the blocks 116 of the blockchain 114 across the distributed architecture of the blockchain system 102. Other types of nodes 110 are also included as part of the blockchain system 102. In one such example, full nodes are nodes that store an entirety of the blockchain 114, e.g., locally in computer-readable storage media of a respective storage device. Other types of nodes are also employed to implement additional functionality to govern voting events, execution of protocol operations, rules enforcement, and so forth.

The blockchain system 102 implements a virtual machine 122 that is representative of a diverse range of functionality made possible by leveraging the blockchain 114. In a first such example, the virtual machine 122 implements a distributed ledger 124 of accounts 126 and associated balances 128 of those accounts 126. Distributed ledgers 124 support secure transfer of digital assets (e.g., tokens or coins of cryptocurrencies) between accounts 126 without management by a central authority through storage as part of the transaction data 120 of the blockchain 114. Through synchronized and distributed access supported by the blockchain 114 as described above, changes to balances 128 (e.g., a number of tokens) are visible to any entity with access to the blockchain 114. Techniques are also implemented to support management of the balances 128 across the accounts 126, e.g., to enforce rules that a respective account 126 does not transfer more coins than are available based on a balance 128 specified for that account 126.

In another example, the virtual machine 122 implements a distributed state machine 130 that supports application 132 execution. The distributed state machine 130 is implemented along with the transaction data 120 within the blocks 116 of the blockchain 114 such that the blocks describe accounts and balances as described above for the distributed ledger 124. The transaction data 120 also supports a machine state, which can change from block to block of the blockchain 114. In one example, the application 132 is executable as part of a "Turing-complete" decentralized virtual machine that is distributed across the nodes 110 of the blockchain system 102. As Turning-complete, the application 132 is computationally universal to perform computing device operations, e.g., logic or computing functions. Thus, the application 132 is executable by a processing system of a computing device as software that is storable in a computer-readable storage media of the nodes 110 to perform a variety of operations.

An example of an application 132 that is executable as part of the distributed state machine 130 is a smart contract 134. A smart contract 134 is executable automatically and without user intervention (or with partial human interaction as inputs when desired) by the nodes 110 of the distributed state machine 130. Execution of the smart contract 134 includes obtaining data from a specified data source (e.g., devices, APIs, and so forth that are accessible via the network 108), and based on this data, initiating one or more operations based on conditions described in the smart contract 134. In one or more examples, the smart contract 134 is a type of account 126 that includes a balance 128 and initiates transactions based on conditions specified by the smart contract 134, e.g., to support automated escrow and other functionalities. A variety of other examples are also contemplated that support implementation of any executable operation by a computing device using software. Cryptocurrencies (e.g., coins of the cryptocurrency) are a native asset of the blockchain 114, and tokens are created "on top" of these blockchains. Cryptocurrencies allow individuals to make payments using their digital currency. Individuals can use tokens, however, for other purposes. By way of example, individuals can use tokens for trading, to hold and store value, and so forth. Some examples of types of tokens include utility tokens, governance tokens, security tokens, and non-fungible tokens (NFTs). Utility tokens, for example, provide an owner of the token with access to a blockchain-based product or service.

In an additional example of a token, the smart contracts 134 may, for example, implement NFTs. NFTs include digital assets that are provably unique and as such cannot be duplicated or divided. As such, NFTs are not exchanged as having a same value as coins in cryptocurrency, but rather are digital assets having identifying information recorded as part of the smart contract 134. This identifying information is immutably recorded on that token's blockchain 114 and thus ownership of the token is also recorded and tracked. A variety of information is storable as part of the digital content represented by the NFT, examples of which include digital images, digital media, digital content, executable instructions of an application 132 as described above, secure file links, in-game tokens, digital artwork, and so forth. Other examples of tokens are also contemplated that are fungible and as such are interchangeable with each other.

The client device 106 includes a client blockchain module 136 that is representative of functionality of the client device 106 to interact with the blockchain system 102. An example of this functionality includes management of a crypto wallet 138, e.g., in local storage device 140. The crypto wallet 138 stores public and private cryptographic keys in this example that are used to support interaction with the blockchain system 102, and more particularly respective accounts 126 of the blockchain system 102, via a user interface 142.

The public key supports transactions to an address of the account 126 derived from the public key, which are stored as part of the blockchain 114 to memorialize the transaction as part of transaction data 120. In one example, an address of an account 126 is generated by first generating a private key, e.g., using a randomization technique. The corresponding public key is derived from the private key and the address of the account 126 is then derived from the public key, e.g., as an entirety of the public key or as a shortened version of the public key. The private key is used to "unlock" transactions that are "locked" by the public key and gain access to the account 126, e.g., access to coins, tokens or other information maintained as part of the transaction.

The blockchain environment 100 also includes a service provider system 104 implementing a service platform 144 of digital services 146, illustrated as maintained in a storage device 148 and are executable via a processing system. Digital services 146 involve electronic delivery of data and implementation of data functionality by computing devices to support a range of computing device operations. Digital services 146, for instance, include creation, management, and dissemination of digital content via the network 108, e.g., webpages, applications, digital images, digital audio, digital video, and so forth. The digital services 146 are also implemented to control access to and transfer of physical goods and services through corresponding digital content, e.g., sales, product listings, advertisements, etc. Digital services 146 further pertain to operation of computational resources (e.g., processing, memory, and network resources) of computing devices that support the access to and management of the digital content by the system.

Functionality of the client device 106 to access the digital services 146 of the service provider system 104 is represented by respective client service module 150. The client service module 150 is configurable as a browser, network-enabled applications, third-party plugins, and so on to access the digital services 146 via the network 108.

The service provider system 104 also includes a reputation manager module 152. The reputation manager module 152 is configured to, via a blockchain interaction manager module 154, manage the transfer of reputation tokens through use of an application 132 generated by the service provider system 104 and executed by the distributed state machine 130. The service platform 144, for instance, includes a digital service 146 configured to support transactions of items, e.g., physical items or digital content, using service provider accounts. Transferring reputation tokens can be initiated by the service platform 144, responsive to a transaction, based on a reputation reward calculated based on data describing the transaction. The blockchain interaction manager module 154 of the reputation manager module 152 of the service platform 144, for instance, initiates, via the blockchain system 102, a transfer ownership of reputation tokens to a blockchain account 126 as part of the blockchain 114, ownership of which is associated with a blockchain account 126 of a participant of the transaction. In this way, execution of the application 132 provides an ability of the service provider system 104 to communicate further with the client device 106.

Figure 2:
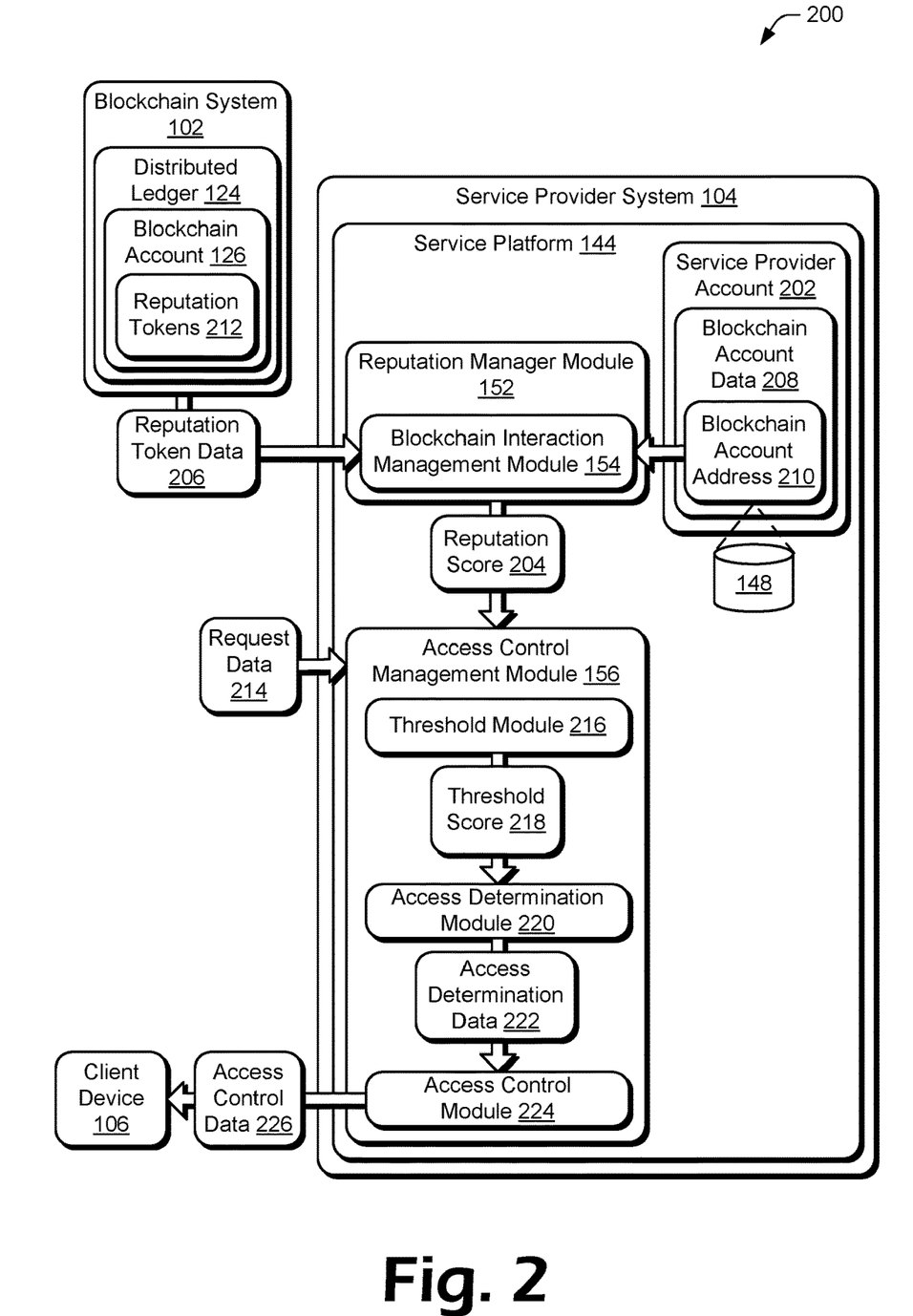
FIG. 2 depicts a system in an example implementation showing operation of a service platform of a service provider system of FIG. 1 in greater detail as controlling access of a service provider account to a transaction based on a reputation score of the service provider account.

As already discussed, leveraging reputation tokens 212 of a blockchain system 102 to establish a reputation confers many advantages over establishing a reputation via a conventional reputation score. For example, unlike conventional reputation scores, reputation tokens 212 are solely owned by a user having a private key associated with the blockchain account address 210 associated with the reputation tokens 212. Because users own the reputation tokens, this ownership enables users to establish a universal reputation that can be used with different service provider systems instead of just one. This is different from the use of conventional reputation scores, which often limit the use of a conventional reputation score to the service provider system 104 that owns the relevant data. Accordingly, the use of reputation tokens 212 empowers users due to their personal ownership and possession of the reputation tokens 212 while also enabling broad use of a reputation token-based reputation due to the data being decentralized.

Leveraging reputation tokens 212 of a blockchain system 102 also provides superior security and protection than conventional reputation scores. This is because reputation token data 206 is recorded via a decentralized blockchain system 102 instead of a centralized system. Reputation tokens 212 are also further secured via cryptography. Further, reputation tokens 212 associated with a blockchain account address 210 are more resistant to tampering or deletion by parties without a private key associated with the blockchain account address 210. In contrast, data owned by a centralized system (e.g., a centralized service provider system 104) is vulnerable to tampering, deletion, breaches, and other adverse outcomes. For example, although an employee of a service provider system 104 can delete a conventional reputation score associated with a service provider account 202, the employee cannot tamper with reputation tokens 212 without a correct private key. In at least these ways, reputation tokens 212 confer advantages over conventional reputation scores.

The service provider system 104 also includes an access control management module 156. The access control management module 156 is configured to control access of service provider accounts to transactions. For instance, the access control management module 156 prevents a transaction when the access control management module 156 determines that the transaction is denied for a service provider account.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Controlling Access Based on Tokenized Reputation Scores

FIG. 2 depicts a system in an example implementation showing operation of a service platform of a service provider system of FIG. 1 in greater detail as controlling access of a service provider account to transactional functionality based on a reputation score of the service provider account.

To begin in the illustrated example of FIG. 2, a service provider system 104 includes a service platform 144 having a reputation manager module 152, an access control management module 156, and a storage device 148. The service platform 144 of the service provider system 104 is configured to support user activity of client devices (e.g., client device 106), such as transactions, by implementing digital services 146. In one or more implementations, the digital services 146 are executable to initiate transfer of ownership and/or possession of an item to or from the client device 106, a blockchain account 126, and so forth. The reputation manager module 152 is configured to manage processes relevant to tokenized reputation of service provider accounts 202 of the service provider system 104, including generation of a reputation score 204 of a service provider account 202, obtaining reputation token data 206 from a blockchain system 102, and so forth. The access control management module 156 is configured to manage processes relevant to access control of transactional functionality for service provider accounts 202 of the service provider system 104. The storage device 148 includes a service provider account 202 having blockchain account data 208 having a blockchain account address 210 associated with the service provider account 202. The storage device 148 also may include other data, such as a service provider account identifier, transactional data, and so forth.

In system 200, the reputation manager module 152 generates a reputation score 204 affiliated with a service provider account 202 associated with a blockchain account address 210. In one or more implementations, the generating of the reputation score 204 is based at least in part on an amount of reputation tokens 212 associated with the blockchain account address 210 of blockchain account 126. The reputation score 204 is based at least in part on transactional data associated with the blockchain account address 210 of blockchain account 126. The amount of reputation tokens 212 associated with the blockchain account address 210 of the blockchain account 126 can be determined by the service provider system 104 in various ways, such as, but not limited to, via receipt of reputation token data 206 from the blockchain system 102 by the blockchain interaction module 154 of the reputation manager module 152.

In one example, the reputation score 204 is generated based additionally or alternatively on NFTs associated with the blockchain account address 210 associated with the service provider account 202. By way of example, NFTs representing reputability (e.g., a verified identity, verified or verifiable credentials, etc.) result in the generation of a higher tokenized reputation score 204 affiliated with a service provider account 202. For instance, an NFT representing verified credentials (e.g., from a service provider system 104, a government agency, a credit agency, or so forth) associated with the blockchain account address 210 associated with the service provider account 202 can be used to generate a tokenized reputation score 204.

In the illustrated example, the service provider system 104 receives request data 214 to perform a transaction. By way of example, the request data 214 can be received from various computing devices, such as the client device 106. In this illustrated example, the access control management module 156 receives the request data 214. In one example, the request data 214 is a request from a service provider account 202. For instance, service provider account 202 that is a buyer or a bidder. In another example, the request data 214 is a request to participate in a transaction, such as an auction. Alternatively, or additionally, the request data 214 is a request to submit an offer in a transaction, such as a bid, an order submission, or so forth.

The service provider system 104 is configured to, via a threshold module 216, obtain a threshold score 218 associated with the transaction. Threshold scores can be in a numerical format, such as from '0' to '850'. By way of example, a threshold score for a luxury item transaction can be '800', whereas a threshold score for an instant purchase transaction can have a threshold score of '0'. In at least some instances, the threshold score 218 is selected from a plurality of threshold scores, each threshold score 218 of the plurality of threshold scores corresponding to a type of transaction. Some examples of different types of transactions include luxury item transactions, auction transactions, fiat currency transactions, crypto transactions, instant purchase transactions, and so forth. By way of example, a luxury item type of transaction can correspond with a higher threshold score than a than a threshold score corresponding to a non-luxury item type of transaction. The threshold module 216 also includes functionality to calculate the threshold score 218 based on an amount (e.g., an amount of fiat currency, an amount of cryptocurrency, etc.) involved in a transaction. It is to be appreciated that the threshold score 218 may be based on any number of factors, such as a threshold severity, a threshold risk, or so forth. In one example, the threshold score 218 is predetermined or preselected by a host service provider account 202 that is hosting the requested transaction. In this way, host service provider accounts 202 are enabled to customize the degree of risk that they are comfortable with while hosting listings online via the service provider system 104 or the service platform 144.

The service provider system 104 is configured to, via an access determination module 220, determine that the transaction is denied or permitted for the service provider account 202 by comparing the reputation score 204 with the threshold score 218 associated with the transaction. The determination module 220, for instance, determines that a transaction is denied when a reputation score 204 is equal to or lower than a threshold score 218. Alternatively, or additionally, the determination module 220 determines that a transaction is permitted when a reputation score 204 is equal to or higher than a threshold score 218. In this illustrated example, this determination by the access determination module 220 is received as access determination data 222 by the access control module 224.

Upon receiving the access determination data 222 (the determination as to whether to deny or permit the transaction), an access control module 224 of the service provider system 104 denies or permits the transaction. The access control module 224, for instance, prevents the transaction when the access determination data 222 includes a determination that the transaction is denied. The access control module 224, in another instance, is configured to permit the transaction when the access determination data 222 includes the determination that the transaction is permitted.

The access control module 224 of the service provider system 104 is indicative of functionality to manage access control of service provider accounts 202. In this example illustration, the access control module 224 passes access control data 226 to the client device 106 of a service provider account 202 to permit or prevent the transaction. The control data 226 is configured to include a variety of information, examples of which include a displayable indication (e.g., a notification) that the transaction is permitted or prevented, an error string informing that the request is permitted or prevented, or so forth. Therefore, in this manner, the service provider system 104 controls access of the service provider account 202 to transactional functionality based on a tokenized reputation score 204 of the service provider account 202.

Figure 3:
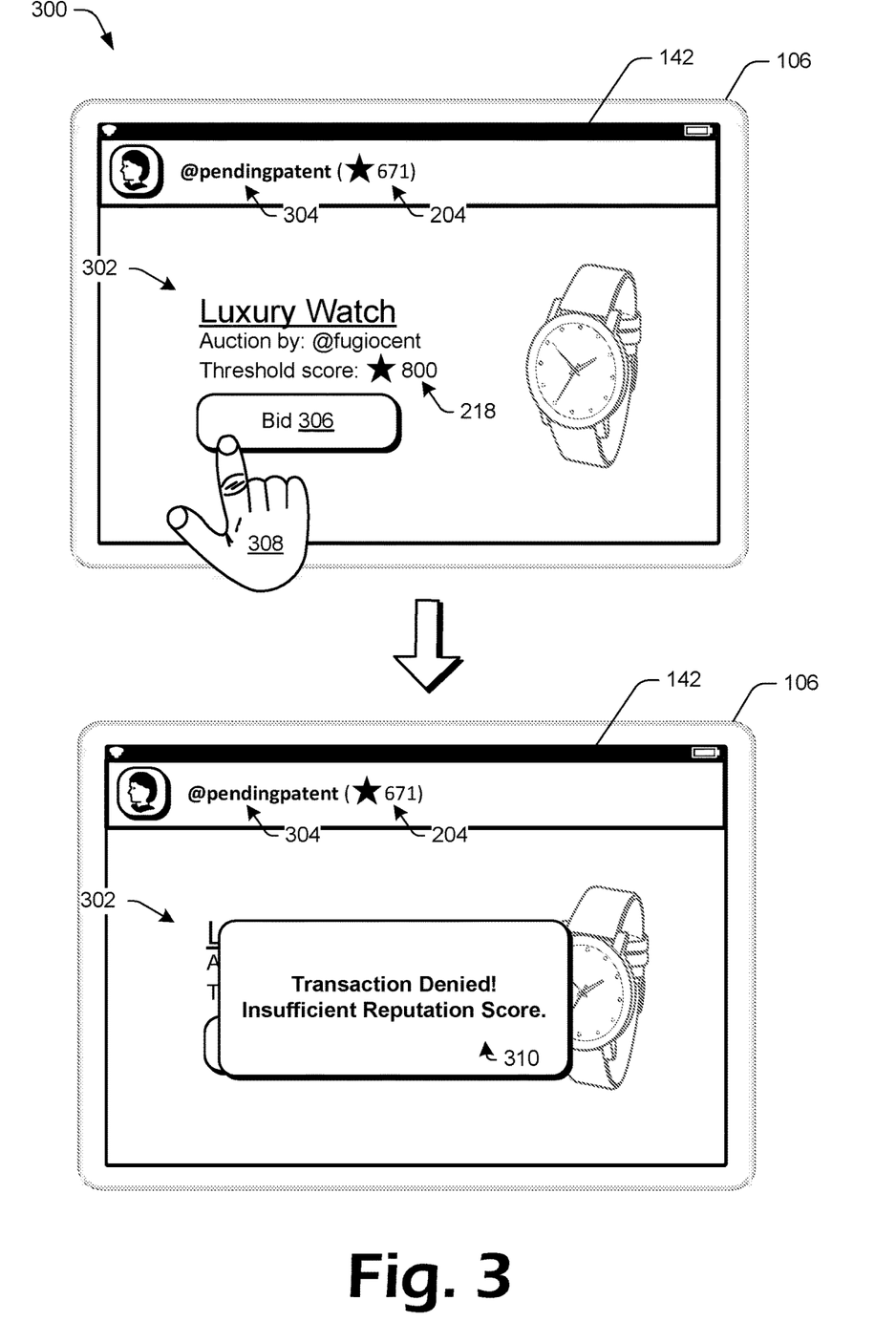
FIG. 3 depicts an example implementation of a user interface of a client device depicting a request for a transaction that is denied to a service provider account based on the service provider account's reputation score being below a threshold score associated with the transaction requested.

FIG. 3 depicts an example implementation 300 of a user interface of a client device depicting a request for a transaction that is denied to a service provider account based on the service provider account's reputation score being below a threshold score associated with the transaction requested.

The illustrated example implementation 300 includes from FIG. 1 an example of the client device 106 displaying an example of the service platform 144 via a user interface 142 of the client device 106, e.g., a touchscreen. The illustrated example implementation 300 also includes from FIG. 2 an example of a reputation score 204 and an example of a threshold score 218. Here, the user interface 142 includes a listing 302 for a luxury watch that is listed for an online auction of a service provider system 104, a representation 304 of a service provider account 202 of the service provider system 104, a reputation score 204 of the service provider account 202, a threshold score 218 for the transaction of the listing 302, and a selectable element 306 for selection via user input 308 to submit a request (e.g., request data 214) to participate in the transaction. It is to be appreciated that the service platform 144 is configurable to include other selectable elements that are selectable to submit request data 214 for a transaction.

Specifically, in this illustrated example implementation 300, the luxury watch transaction of listing 302 has a threshold score of 800, and the service provider account 202, as represented by the representation 304, has a reputation score 204 of 671. In summary, the reputation score 204 of the service provider account 202 is below the threshold score 218 of the listing 302. In the illustrated example implementation 300, a user input is received via the selectable element 306, thus submitting request data 214 for the transaction. However, because 800 is higher than 671, the threshold score is higher than the reputation score of the service provider account 202. Accordingly, the transaction of illustrated example implementation 300 is denied, as indicated by the depicted notification 310.

It is to be appreciated that the above noted example is merely one example of how access by a service provider account to transactional functionality may be controlled based on a tokenized reputation score of a service provider account. In this context, consider the following discussion of FIG. 4.

Figure 4:
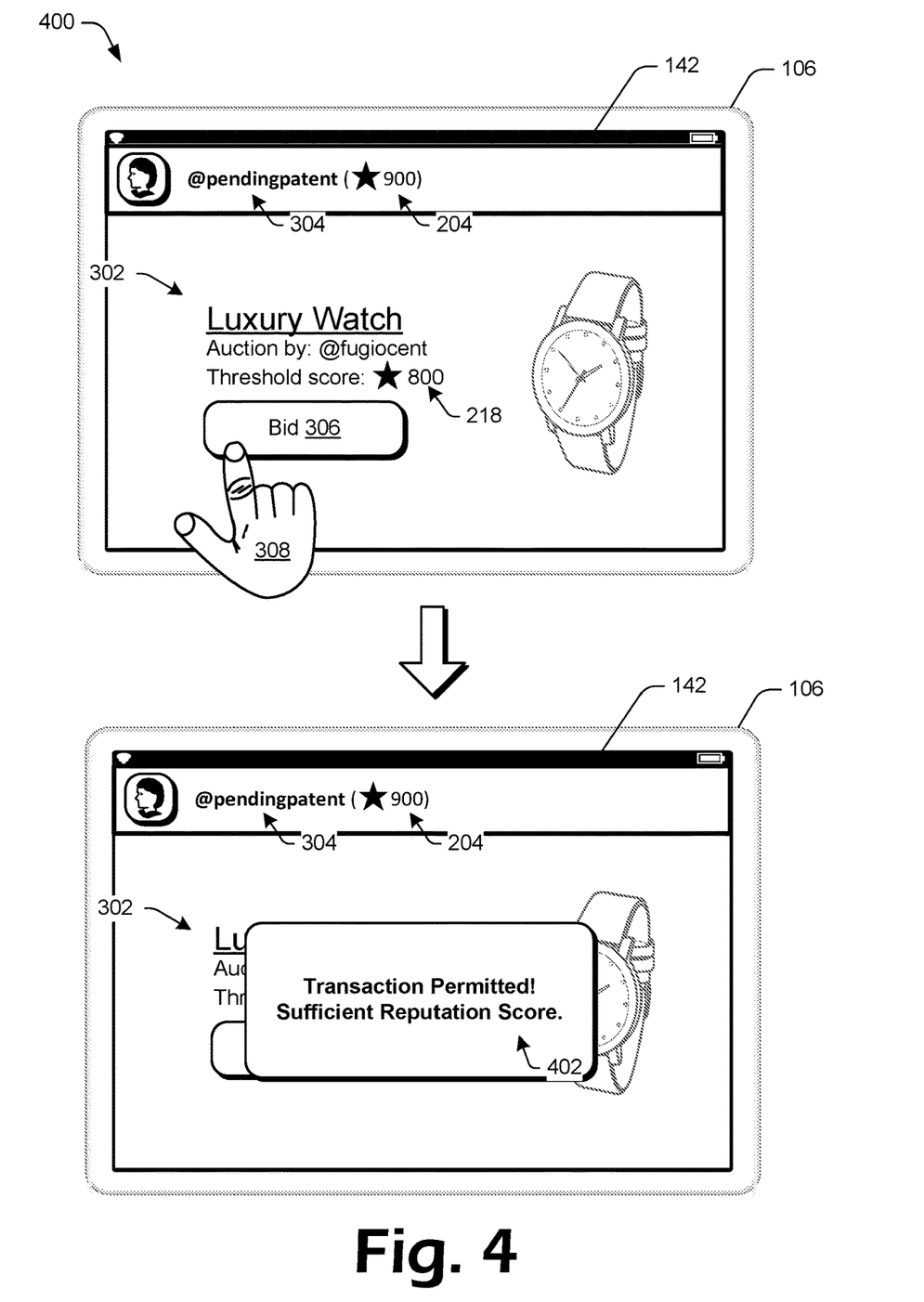
FIG. 4 depicts an example implementation of a user interface of a client device depicting a request for a transaction that is permitted to a service provider account based on the service provider account's reputation score being above a threshold score associated with the transaction requested.

FIG. 4 depicts another example implementation 400 of a user interface 142 of a client device 106 depicting a request for a transaction that is permitted for a service provider account 202 of a service provider system 104 based on the service provider account's 202 reputation score 204 being above a threshold score 218 associated with the transaction requested.

The illustrated example implementation 400 includes from FIG. 1 an example of the client device 106 displaying an example of the service platform 144 via a user interface 142 of the client device 106, e.g., a touchscreen. The illustrated example implementation 400 includes from FIG. 2 an example of a reputation score 204 and an example of a threshold score 218. The illustrated example implementation 400 includes from FIG. 3 an example representation 304 of a service provider account 202, an example listing 302 for a transaction, an example selectable element 306 that is selectable to submit a request a transaction for listing 302, and an example user input 308. Here, the user interface 142 includes a listing 302 for a luxury watch for an online auction of a service provider system 104, a representation 304 of a service provider account 202 of the service provider system 104, a reputation score 204 of the service provider account 202, a threshold score 218 for the transaction of the listing 302, and a selectable element 306 that can be selected via user input 308 to submit a request to participate in the transaction. It is to be appreciated that the service platform 144 may include other selectable elements that are selectable to submit request data 214 for a transaction. It is to also be appreciated that user input 308 may be provided in a variety of ways, including via touch, audio, recognized gestures, and so forth.

Specifically, in this illustrated example implementation 300, the luxury watch transaction of listing 302 has a threshold score of 800, and the service provider account 202, as represented by the representation 304, has a reputation score 204 of 900. In summary, the reputation score 204 of the service provider account 202 is below the threshold score 218 of the listing 302. In the illustrated example implementation 300, a user input is received via the selectable element 306, thus submitting request data 214 for the transaction. Because 900 is higher than 800, the threshold score is lower than the reputation score of the service provider account 202. Accordingly, the transaction of illustrated example implementation 300 is permitted, as indicated by the depicted notification 402.

It is to be appreciated that the above noted example is merely one example of how access by a service provider account to transactional functionality may be controlled based on a tokenized reputation score of a service provider account.

Figure 5:
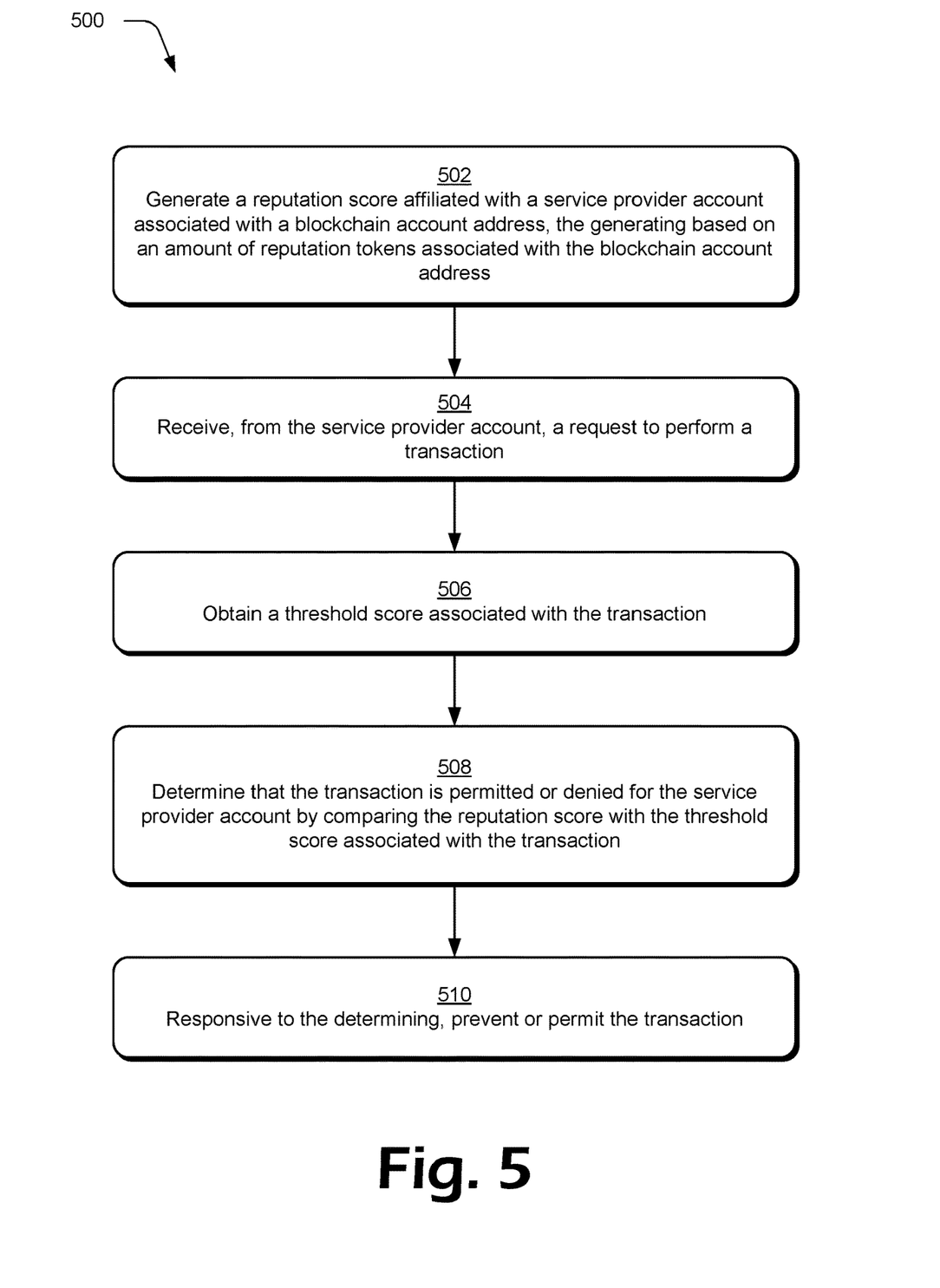
FIG. 5 is a flow diagram depicting a procedure in an example implementation of transaction access control using tokenized reputation scores.

FIG. 5 is a flow diagram depicting a procedure 500 in an example implementation of transaction access control using tokenized reputation scores 204.

To begin this example, the service provider system 104 generates a reputation score 204 affiliated with a service provider account 202 associated with a blockchain account address 210 (block 502). The generation of the reputation score 204 is based on an amount of reputation tokens 212 associated with the blockchain account address 210 (block 502). As previously described, the service provider system 104 can alternatively or additionally generate a reputation score 204 affiliated with a service provider account 202 associated with a blockchain account identifier (e.g., an Ethereum Name Service domain name, a Coinbase Wallet username, and so forth) instead of a blockchain account address 210, where the blockchain account identifier is associated with the blockchain account address 210. By way of example, the blockchain account identifier can be mapped to a blockchain account address 210 that is associated with a service provider account 202.

Although this procedure 500 depicts a flowchart where the service provider system 104 generates a reputation score 204 based at least in part on an amount of reputation tokens 212 associated with the blockchain account address 210 of blockchain account 126, the generation of the reputation score 204 is performable in a variety of ways, such as through generating the reputation score 204 additionally or alternatively based on transactional data associated with the blockchain account address 210. Notably, the amount of reputation tokens 212 can be determined by the service provider system 104 in various ways. For instance, the blockchain interaction management module 154 is configured to receive reputation token data 206 from the blockchain system 102. By way of example, the blockchain interaction management module 154 automatically receives reputation token data 206 from the blockchain system 102 (e.g., via a smart contract 134 or an application 132) at predefined intervals by the blockchain interaction module 154, responsive to a predefined condition being met.

To continue this example, the service provider system 104 receives a request from the service provider account 202 to perform a transaction (block 504). This is performable in a variety of ways, such as via user input received via a user interface 142 of a client device 106 of a service provider account 202 of the service provider system. By way of example, user input is one of various ways to request to submit a bid for an online auction of a service provider system 104. As discussed throughout, various types of transactions are contemplated, such as auction transactions. As discussed throughout, the request may be received from a variety of computing devices, including but not limited to a client device 106. In one or more examples, user input submitting the request is received via a selectable element (e.g., the example selectable element 306 of FIGS. 3 and 4).

A threshold score 218 associated with the transaction is then obtained (block 506). As discussed throughout, the threshold score 218 can be received from a variety of sources, including a client device 106. The threshold score 218 is also capable of changing in real time (e.g., based on a real-time assessment of risk, a predicted severity of an adverse outcome, and so forth), or being static. As discussed throughout, the threshold score 218 may be selected from a plurality of threshold scores 218, each threshold score 218 of the plurality of threshold scores 218 corresponding to a type of transaction (e.g., a luxury transaction).

Additionally, or alternatively, the threshold score 218 can also be calculated based on an amount (e.g., an amount of fiat currency, an amount of cryptocurrency, etc.) involved in a transaction. By way of example, a transaction corresponding to a value or an amount of 1 Bitcoin may have a higher threshold score than a transaction corresponding to a value or an amount of 50,000,000 satoshis (half of a Bitcoin).

Further, the service provider system 104 determines that the transaction is permitted or denied for the service provider account by comparing the reputation score with the threshold score associated with the transaction (block 508). As previously described, determining that a transaction is denied can include determining that the reputation score 204 is equal to or lower than the threshold score 218. Alternatively, or additionally, determining that a transaction is permitted can include determining that the reputation score 204 is equal to or higher than the threshold score 218.

In response, the service provider system 104 prevents or permits the transaction (block 510). In one instance, a client device 106 of a service provider account 202 receives an indication that the transaction is denied or permitted based on the determination. In another example, the user interface 142 of a client device 106 of a service provider account 202 displays a notification denying an attempted transaction based on a determination to deny or prevent the transaction. In this manner, access by a service provider account 202 to transactional functionality is controlled by the service provider system 104 based on a tokenized reputation score 204 of the service provider account 202.

Figure 6:
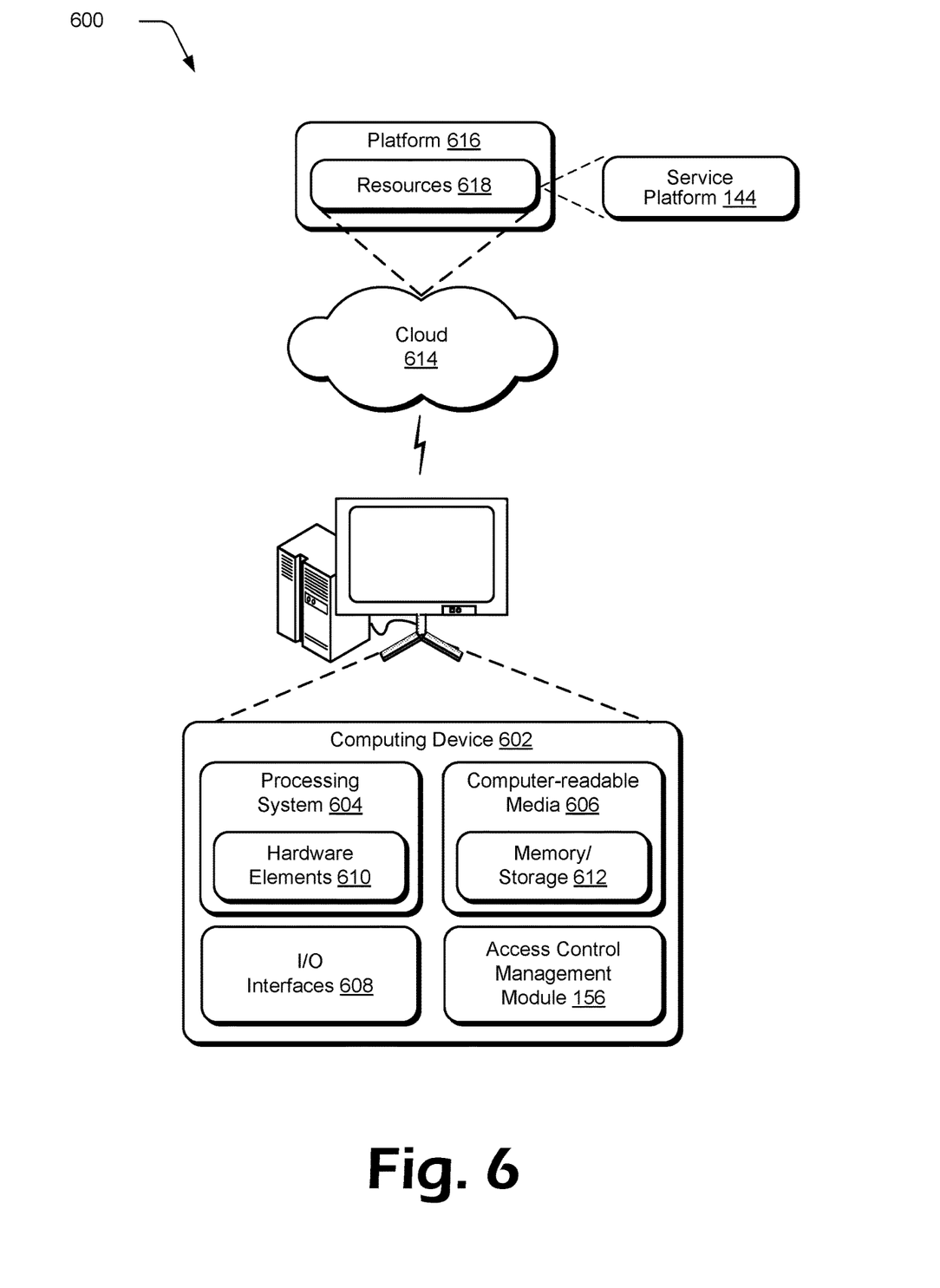
FIG. 6 illustrates an example system including various components of an example device that can be implemented as any type of computing device as described and/or utilize with reference to FIGS. 1-6 to implement embodiments of the techniques described herein.

FIG. 6 illustrates an example system generally at 600 that includes an example computing device 602 that is representative of one or more computing systems and/or devices that may implement the various techniques described herein, such as the nodes of FIG. 1. This is illustrated through inclusion of the service platform 144 and the access control management module 156. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618, the resources 618 including access control management module 156. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    generating, by the computing device, a reputation score for a service provider account having a blockchain account address, the reputation score based on an amount of reputation tokens associated with the blockchain account address, the reputation tokens being accessible by a cryptographic private key associated with the blockchain account address;
    receiving, by the computing device, a request to perform a transaction from the service provider account;
    determining, by the computing device, a threshold score associated with the transaction based on whether the transaction is a purchase transaction or an auction transaction; and
    permitting, by the computing device, the transaction based on the reputation score being higher than the threshold score.

2. The method of claim 1, wherein the generating the reputation score is further based on a length of a transactional history of the blockchain account address associated with the service provider account.

3. The method of claim 1, wherein the generating the reputation score is further based on non-fungible tokens representing verified credentials associated with the blockchain account address.

4. The method of claim 1, wherein the generating the reputation score includes receiving, via a smart contract of a decentralized blockchain system, the amount of reputation tokens associated with the blockchain account address.

5. The method of claim 1, wherein the generating the reputation score includes receiving, from a distributed ledger of a decentralized blockchain system, the amount of reputation tokens.

6. The method of claim 1, wherein the determining the threshold score is further based on an amount of use associated with the service provider account.

7. The method of claim 1, wherein the threshold score is lower based on the transaction being the purchase transaction, rather than the auction transaction.

8. The method of claim 1, further comprising initiating, by the computing device and responsive to the permitting, display of a notification at a client device associated with the service provider account, the notification indicating that the transaction is permitted.

9. The method of claim 1, further comprising preventing, by the computing device, the transaction based on the reputation score being equal to or lower than the threshold score.

10. The method of claim 9, further comprising initiating, by the computing device and responsive to the preventing, display of a notification at a client device associated with the service provider account, the notification indicating that the transaction is prevented.

11. The method of claim 1, wherein the reputation tokens are cryptographic utility tokens.

12. A system comprising:
    at least one processor; and
    a computer-readable storage medium storing instructions that are executable by the at least one processor to perform operations comprising:
        generating a reputation score for a service provider account having a blockchain account address, the reputation score based on an amount of reputation tokens associated with the blockchain account address, the reputation tokens being accessible by a cryptographic private key associated with the blockchain account address;
        receiving, from the service provider account, a request to perform a transaction;
        determining a threshold score associated with the transaction based on a type of currency involved in the transaction; and
        permitting the transaction based on the reputation score being higher than the threshold score.

13. The system of claim 12, wherein the generating the reputation score is further based on a length of transactional history of the blockchain account address associated with the service provider account.

14. The system of claim 12, wherein the generating the reputation score is further based on non-fungible tokens representing a verified identity associated with the blockchain account address.

15. The system of claim 12, wherein the determining the threshold score is further based on an amount of use associated with the service provider account.

16. The system of claim 12, wherein the determining the threshold score is further based on whether the transaction is a fiat currency transaction or a cryptocurrency transaction.

17. The system of claim 12, the operations further including initiating, responsive to the permitting, display of a notification at a client device associated with the service provider account, the notification indicating that the transaction is permitted.

18. The system of claim 12, the operations further including preventing the transaction based on the reputation score being equal to or lower than the threshold score.

19. The system of claim 18, the operations further including initiating, responsive to the preventing, display of a notification at a client device associated with the service provider account, the notification indicating that the transaction is prevented.

20. One or more computer-readable storage media storing instructions that, responsive to execution by a processing device, initiate the processing device to perform operations including:
- generating a reputation score for a service provider account having a blockchain account address, the reputation score based on an amount of reputation tokens associated with the blockchain account address, the reputation tokens being accessible by a cryptographic private key associated with the blockchain account address;
- receiving a request to perform a transaction from the service provider account;
- determining a threshold score associated with the transaction based on whether the transaction is a purchase transaction or an auction transaction; and
- preventing the transaction based on the reputation score being equal to or lower than the threshold score.

* * * * *